United States Patent
Benjes et al.

(10) Patent No.: US 7,634,771 B2
(45) Date of Patent: Dec. 15, 2009

(54) OBJECT GENERATION IN PACKAGES

(75) Inventors: Friederike Benjes, Heidelberg (DE); Andreas Blumenthal, Heidelberg (DE); Thomas Decker, Langenbrücken (DE); Rasmus Faust, Heidelberg (DE); Markus Frick, Karlsruhe (DE); Gerd Kluger, Sinsheim (DE); Ulrich Koch, Heidelberg (DE); Helmut Prestel, Bad Schönborn (DE); Juergen Remmel, Muehlhausen (DE); Martin Runte, Darmstadt Hesse (DE); Andreas Simon Schmitt, Kaiserslautern (DE); Michael Schneider, Walldorf (DE)

(73) Assignee: SAP (AG), Walldorf (DE)

( * ) Notice: Subject to any disclaimer, the term of this patent is extended or adjusted under 35 U.S.C. 154(b) by 470 days.

(21) Appl. No.: 11/118,700

(22) Filed: Apr. 29, 2005

(65) Prior Publication Data
US 2006/0248507 A1  Nov. 2, 2006

(51) Int. Cl.
  *G06F 9/445* (2006.01)
  *G06F 9/44* (2006.01)
(52) U.S. Cl. .................. 717/174; 717/175; 717/176; 717/177; 717/178; 717/168; 717/169; 717/171; 717/172; 717/173; 717/170
(58) Field of Classification Search .......... 717/174–178, 717/168, 169, 171–173, 170
See application file for complete search history.

(56) References Cited

U.S. PATENT DOCUMENTS

| | | |
|---|---|---|
| 5,287,507 A | 2/1994 | Hamilton et al. |
| 5,307,490 A | 4/1994 | Davidson et al. |
| 5,548,726 A | 8/1996 | Pettus |
| 5,754,841 A | 5/1998 | Carino, Jr. |
| 5,764,897 A | 6/1998 | Khalidi |
| 5,793,965 A | 8/1998 | Vanderbilt et al. |
| 5,802,367 A | 9/1998 | Held et al. |
| 5,872,973 A | 2/1999 | Mitchell et al. |
| 5,884,316 A | 3/1999 | Bernstein et al. |
| 5,950,010 A * | 9/1999 | Hesse et al. ............. 717/178 |
| 6,016,496 A | 1/2000 | Roberson |
| 6,038,590 A | 3/2000 | Gish |
| 6,043,837 A | 3/2000 | Driscoll, Jr. et al. |
| 6,101,528 A | 8/2000 | Butt |
| 6,102,965 A | 8/2000 | Dye et al. |
| 6,125,383 A | 9/2000 | Glynias et al. |
| 6,134,603 A | 10/2000 | Jones et al. |

(Continued)

FOREIGN PATENT DOCUMENTS

JP  407295929 A  11/1995

OTHER PUBLICATIONS

Finkelstein et al. "Software Package Requirements & Procurement", 1996, IEEE, p. 141-145.*

(Continued)

*Primary Examiner*—Qamrun Nahar
(74) *Attorney, Agent, or Firm*—Blakely, Sokoloff, Taylor & Zafman, LLP (57) ABSTRACT

A method and system for object generation in packages. In one embodiment, the process for generating an object in a package is initiated. The package is created and is associated with a target package. The object is generated into the package.

13 Claims, 10 Drawing Sheets

U.S. PATENT DOCUMENTS

| | | | |
|---|---|---|---|
| 6,223,217 | B1 | 4/2001 | Pettus |
| 6,236,999 | B1 | 5/2001 | Jacobs et al. |
| 6,314,468 | B1 | 11/2001 | Murphy et al. |
| 7,017,014 | B2 | 3/2006 | Cuomo et al. |
| 7,047,518 | B2 * | 5/2006 | Little et al. ................. 717/110 |
| 7,067,784 | B1 | 6/2006 | Lowans |
| 2001/0013050 | A1 | 8/2001 | Shah |
| 2001/0055303 | A1 | 12/2001 | Horton et al. |
| 2002/0035591 | A1 | 3/2002 | Kimura |
| 2003/0009754 | A1 * | 1/2003 | Rowley et al. .............. 717/177 |
| 2003/0033191 | A1 | 2/2003 | Davies et al. |
| 2005/0010919 | A1 * | 1/2005 | Ramanathan et al. ....... 717/174 |
| 2005/0108704 | A1 * | 5/2005 | Marinelli et al. ............ 717/174 |
| 2005/0155042 | A1 | 7/2005 | Kolb et al. |
| 2005/0256933 | A1 | 11/2005 | Millington et al. |
| 2007/0234290 | A1 * | 10/2007 | Ronen et al. ................. 717/120 |

OTHER PUBLICATIONS

Lunney et al. "Object Persistence in Java", 2003, PPPJ, p. 115-120.*

Suleman et al. "A Flexible Approach to Web Component Packaging", 2006, SAICSIT, p. 257-266.*

Final Office Action for U.S. Appl. No. 11/118,739, Mailed Feb. 13, 2009, 16 pages.

Final Office Action for U.S. Appl. No. 11/118,560, Mailed Feb. 17, 2009, 14 pages.

Notice of Allowance for U.S. Appl. No. 11/118,560; dated Jun. 25, 2009; 13 pages.

Notice of Allowance for U.S. Appl. No. 11/118,739; dated Jun. 25, 2009; 19 pages.

"Using RMI with Client-Side Callbacks", BEA Systems, Inc., accessed Feb. 9, 2009 from http://web.archive.org/web/20000829110606/http://edocs.bea.com/wle/rmi/callbak.htm #1023769., p. 1-14.

Chiueh, Tzi-cker, et al., "Design, Implementation, and Evaluation of a Repairable Database Management System", 21st International Conference on Data Engineering, ICDE 2005, Apr. 5-8, 2005, (Apr. 2005), 1024-1035.

Office Action, U.S. Appl. No. 11/118,560, Mailed Sep. 18, 2008, 19 pages.

Office Action, U.S. Appl. No. 11/118,739, Mailed Sep. 25, 2008, 13 pages.

Waldo, J. "Remote procedure calls and Java Remote Method Invocation", Concurrency, IEEE, vol. 6, No. 3, (Jul.-Sep. 1998), pp. 5-7.

* cited by examiner

OBJECT GENERATION IN PACKAGES

TECHNICAL FIELD

Embodiments of the invention generally relate to the field of data processing systems and, more particularly, to a system and method for object generation in packages.

BACKGROUND

As application development projects grow larger, packages are becoming both increasingly important and cumbersome. For example, when changes are made to currently existing Advanced Business Application Programming™ (ABAP) software, the implication of such changes are difficult to foresee, which often causes problems in the future. Having an improved package can make the software's blueprint visible, which can make the changes to the software foreseeable and better protected against malicious changes.

Figure 1:
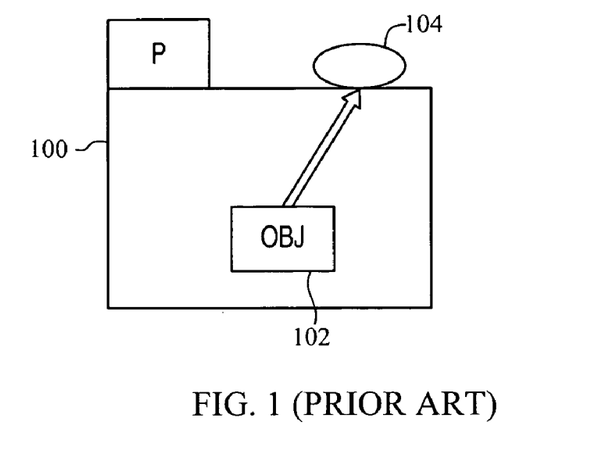
FIG. 1 illustrates a prior art package.

FIG. 1 illustrates a prior art package 100. The package 100 is also known as development classes because it represents a group of objects 102, where each object 102 is assigned to a development class. Each development object 102, such as report, global class, data element, and table, is assigned to the package 100. The object 102 contains organizational attributes, such as person responsible, application component, etc., and technical attributes, such as transport layers, software component, etc. The package 100 also includes a package interface 104 to expose the object 102 to those who seek the object 102.

The package 100 is viewed as a capsule whose content is hidden to the outside. Any interaction with the package's content is accomplished through the development objects 102 that are exposed via an interface 104 of the respective package 100. Furthermore, the package 100 determines transport properties of development object 102 contained in it, such as whether the object 102 can be exported from the system, and what are the target systems (using the assignment to a transport layer).

Figure 2:
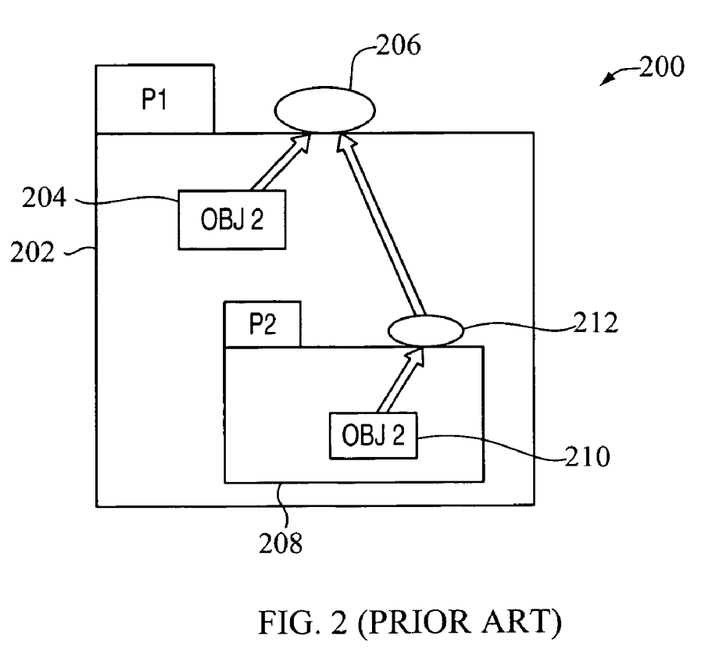
FIG. 2 illustrates a prior art nesting of multiple packages.

Referring now to FIG. 2, it illustrates nesting 200 of multiple packages 202, 208. As illustrated, a package 208 is nested into another package 202. When nesting 200, the package 208 is visible only within its package 202. This package nesting 200, for example, allows for structuring of packages 202, 208 by placing the development objects 210 needed only for a certain part of the implementation into a separate package 208. The package 202 exposes its own development objects 204 via its interface 206 as well as the objects 210 of the package 208. Those development objects of the package 208 that are not exposed at the package's interface 206 are invisible outside the package 202 and can only be used from within the package 202.

Figure 3:
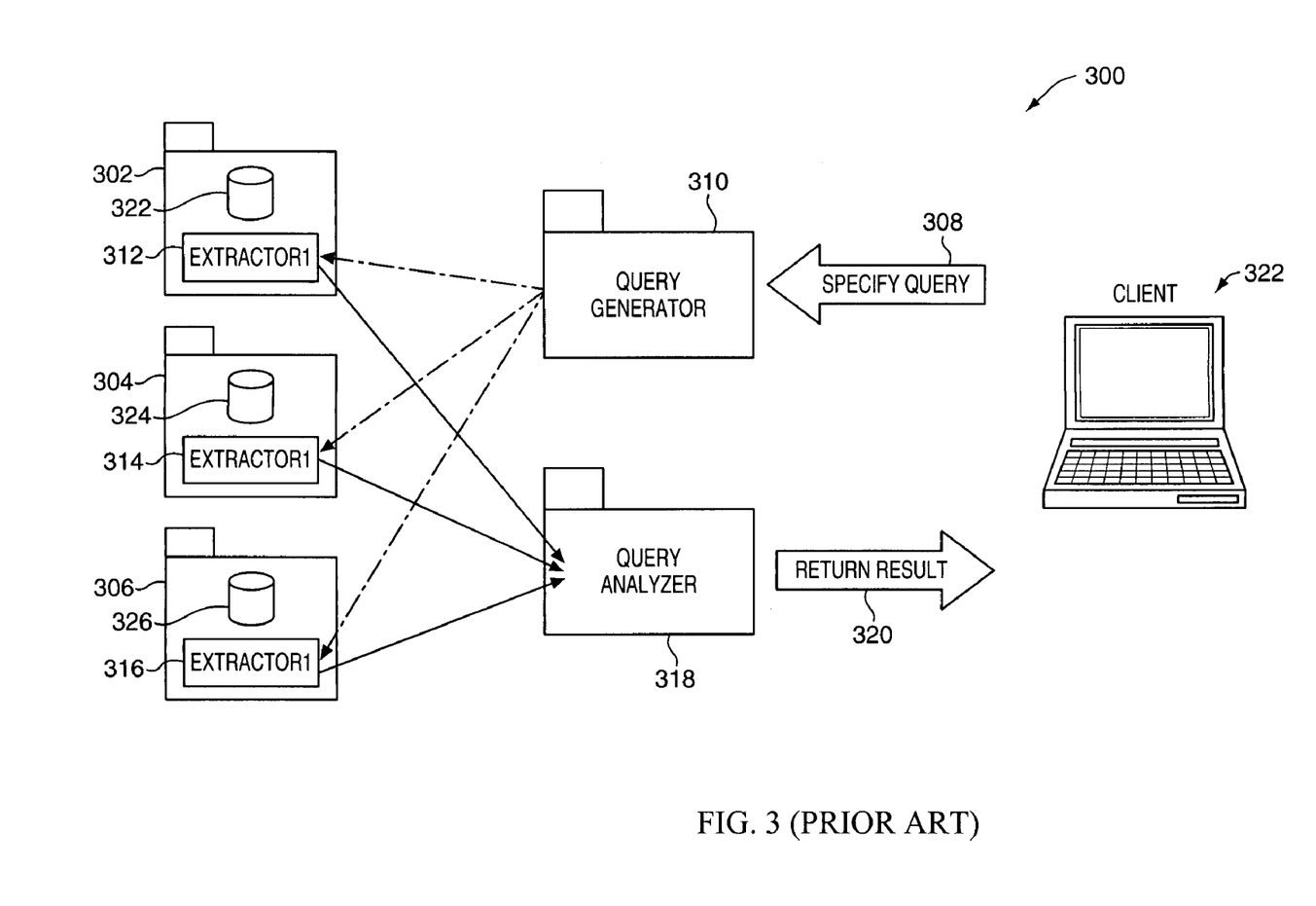
FIG. 3 illustrates a prior art generation mechanism.

FIG. 3 illustrates a prior art generation mechanism 300. As illustrated, a special query 308 is received from a client. The query generator 310 analyzes the query 308 and then generates appropriate extractors 312-316 for the packages 302-306. The term appropriate refers to having the extractors 312-316 that are specifically adopted to the actual query by the generator 310. Due to package modification restrictions, extractors 312-316 are currently generated into special packages outside the packages 302-306 to be analyzed that do not provide such package modification restrictions. Further, several extractors 312-316 can be generated into the same package or even having various generators 310 sharing the same package. Currently, some packages (e.g., non-transportable) are mingled with generated objects that are often unknown and do not provide a real purpose, which, for example, makes it difficult to analyze where the problems with the generated coding might be. The extractors 312-316 then access the packages 302-306 from independent packages.

Each of the packages 302-306 contains an extractor 1-N 312-316 to extract the information needed for forming the results 320. A query analyzer 318 is used to analyze the data extracted from the packages 302-306 and provides the return results 320 back to the client. The illustrated generation mechanism 300 is an example for ad-hoc queries for business data, and the like.

Although the conventional package mechanism provides increasing flexibility for better structuring of software, and represents an essential tool for ensuring and tracking decoupling of software, further improvements to the existing package mechanism are needed. For example, the conventional package mechanism lacks strategies with regard to handling generation of objects and enhancements to software.

SUMMARY

A method and system are provided for object generation in packages. In one embodiment, the process for generating an object in a package is initiated. The package is created and is associated with a target package. The object is generated into the package. In another embodiment, the object is generated in the target package.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Described below is a system and method for object generation in packages. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), Digital Video Disk ROM (DVD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions.

Figure 4:
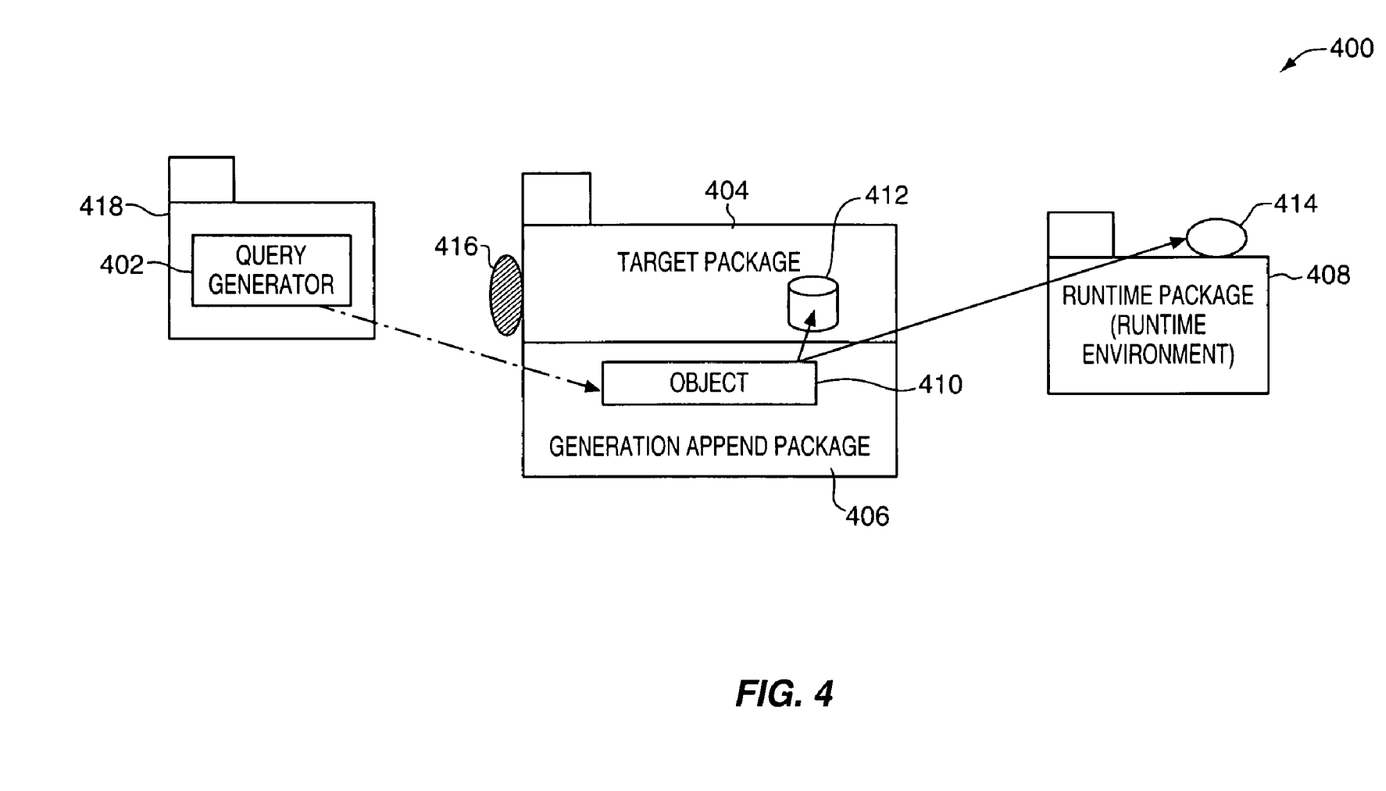
FIG. 4 illustrates an embodiment of an object generation mechanism.

FIG. 4 illustrates an embodiment of an object generation mechanism 400. Object generation is used with implementation of generic components of software, such as ABAP software. In one embodiment, generated objects 410 are assigned to a particular package in which they are generated. For example, the assignment is to the package that defines transport properties of the object 410, or the assignment is to the package that defines the object properties for the package check. In either case, a particular package is referred to as the target package 404. In one embodiment, in the event that the generated objects 410 are to be distinguished from the content 412 of the target package 404, a generation append package 406 may be provided. For example, if the generated objects 410 are to have different transport properties different than those of the target package 404, a generation append package 406 is provided in which the objects 410 are generated. In one embodiment, an object can be generated directly into a target package. In another embodiment, as illustrated, the object 410 is generated into the generation append package 406 associated with the target package 404.

In the illustrated embodiment, a generator 402, residing at a package 418, is used to generate an object 410 in a generation append package 406. The generation append package 406 is associated with the target package 404. The target package 404 controls the generation append package 406 through a client interface 416 (e.g., allowing restricted generation to trusted generators). An access object refers to the right of a service to access objects via a client interface 416. In one embodiment, the generator 402 generates the object 410 into the generation append package 406 of the target package 404 and also specifies interface 414 as the runtime environment for generated objects 410 of the generation append package 406.

In one embodiment, the target package 404 and the generation append package 406 are separated such that the generation append package 406 has different transport properties, uses additional interfaces, and can be recreated flexibly whenever there are changes made to the generator 402, even if the target package 406 itself is not changed. Although the generation append package 406 may have different transport properties and usable packages than those of the target package 404, in light of packet checking, the two packages 404, 406 are regarded identical. The term "generation append package" can be used to refer to either a local generation append packages or a transportable generation append package. Local generation append packages are not to be transported, while transportable generation packages may not have their own transport properties, but they adopt those of the target package 404.

In one embodiment, the generation append package 406 is not created by the client, but created on the basis of requirements by the generator 402. Further, the generation append package 406 includes a single target package which can be a normal package or an enhancement append package. An enhancement append package refers to a package whose content is linked with the content of another (enhanced) package using the packet check, but which is contained in a different software component than the enhanced package.

During execution of the generated objects 410, the generated data may be able to use certain objects that are not provided through the dependency control lists of the target package 404. The objects may be part of a technical infrastructure necessary for the generated data (e.g., generator modules used by generated objects, central registration modules for results from data extractors, and the like). When the generator 402 recreates the objects 410, it can also change properties of the generated data that can have an effect on the actual modules that are used by the generated object 410. In one embodiment, the object generation mechanism 400 supports this in that the generator 402 can change the runtime environment 408 for the generation append package 406.

For local generation append packages, the generator 402, as with specifying the runtime environment 408, can specify package interfaces of the generator package 418 as well as interfaces used by the generator package 418, having permission for propagation. The interfaces specified at the runtime environment 408 of local generation append packages may not affect the transport properties of the target package 404. In transportable generation append packages, the generator 402 can specify the interface 414 as the runtime environment, and the interface 414 being used as the runtime environment is marked as propagatable (i.e., it has given its clients, including the generator 402, the permission to propogate it). The runtime environment 408 of the transportable generation append package is taken into consideration during the determination of transport dependencies.

In one embodiment, the generator 402 is given the permission to specify the runtime environment 408 that goes beyond the target package's dependency control list. Further, the target package 404 can enable the generator 402 to specify the runtime environment 408 for the generation append package 406. Such permissions are provided to the generator 402 by the target package 404. For example, the generator 402 can create client interfaces for the generation append package 406, provided the target package 404 has allowed this through a corresponding entry in the client interface. Using such interfaces, the generated coding could be called from outside of the object generation mechanism 400. The generator 402 can also expose the generated object 410 through existing interfaces of the target package 404, provided the target package 404 allows this through a corresponding entry in the client interfaces. A package interface, such as the package interface 414, includes an interface in which a service exposes certain objects to be used by client packages. A client interface, such as the client interface 416, includes an interface that a client of a service uses to expose certain objects for use by the service.

The generation append package 406 may use the same objects that the target package 404 uses and/or it may use objects from the runtime environment 408 as specified by the generator 402. In one embodiment, if the generation append package 406 is not transportable, the generation of the object 410 in the generation append package 406, similar to dynamic calls, causes no dependencies relevant to software transport. The generation append packages 406 can use objects from the package 406 itself, the target package 404, interfaces that the target package 404 can use, interfaces specified as runtime environment by the generator 402 (which can also be an interface of the generator 402 as a special case). The generated objects 410 can be exposed at a client interface of the generation append package 406 itself, and (through append interfaces) at a package interface of the target package 404 and on further interfaces that propagate that package interface.

In one embodiment, for generation of objects 410, several levels of authorization may be employed. For example, generation of objects 410 may be authorized and allowed in two instances. First, each package may generate an object for itself as target package 404. Second, a foreign package 418 may generate into those target packages 404 that allow the necessary access through their client interfaces 416. The foreign package may include a generation service or an editor. The target package 404 may use its client interface 416 to exercise control of the accesses of the generator 402. For example, such control includes (1) whether the generation can take place directly into the target package 404 (e.g., via editing of package content) or into the generation append package 406; (2) which individual objects the generator 402 may have access to; (3) which types of objects the generator 402 may have access to; and (4) what kind of access (e.g., read, delete, create, expose in interfaces, and the like) is the generator 402 granted.

In one embodiment, metadata (e.g., the actual query in FIG. 3) resides in the analysis application, as opposed to in the target package 404, while the data extractors are generated in the generation append package of the business applications that manage the original data to be analyzed. In another embodiment, metadata refers to customizing settings that may be assigned to a system or certain configuration, but not to a package (although their "container", i.e., the table in which they are stored, is assigned to a package). In another embodiment, metadata is generated into the same generation append package 406 as their resulting objects. The generators 402 may not only generate bottom-line objects, but also metadata for other generators, but in this case, the generated metadata resides in one generation append package and the bottom-line objects in another, as the generation append package 406 is not shared between various generations (i.e., one generation append package 406 is assigned to one generator 402). In yet another embodiment, metadata of the generator 402 is assigned to the target package 404. Assigning the generation append package 406 to both the target package 404 and the generator 402 may reveal the relationship between the generated data, the generator program, and the metadata (which either resides in the target package 404 or is somehow related to the generator 402). However, this may not apply when metadata is a (declarative, non-executable) development object or is related to a development object, such as generated test programs. There are other cases when metadata may lack some characteristics of a development object, such as when metadata is customizing settings.

The generation append packages 406 may not expose objects of the target package 404 through package interfaces of the target package 404. Thus, when objects of the target package 404 are needed in the generated object 410 that is exposed by the generator 402 at the package interface of the target package 402 (e.g., data elements used for the typing of parameters of generated function modules), these objects are not added by the generator 402, but they are provided from the outset. In one embodiment, the generator 402 declares the metadata object as a composite object and the required objects of the target package 404 as component objects of the composite object. A component object refers to an object that is relevant for the package check that appears as part of a component composite object. A composite object refers to an object that is relevant for the package check that contains other objects that are relevant for the package check. There is special handling for composite and component objects by the package check as well as the package administration tools.

In one embodiment, the objects are generated directly into the target package 404, which involves creation of objects using editors. In another embodiment, as illustrated, the objects 410 are not generated directly into the target package 404 and are separated from the actual content of the target package 404 by generating them into one or more generation append packages 406.

Figure 5:
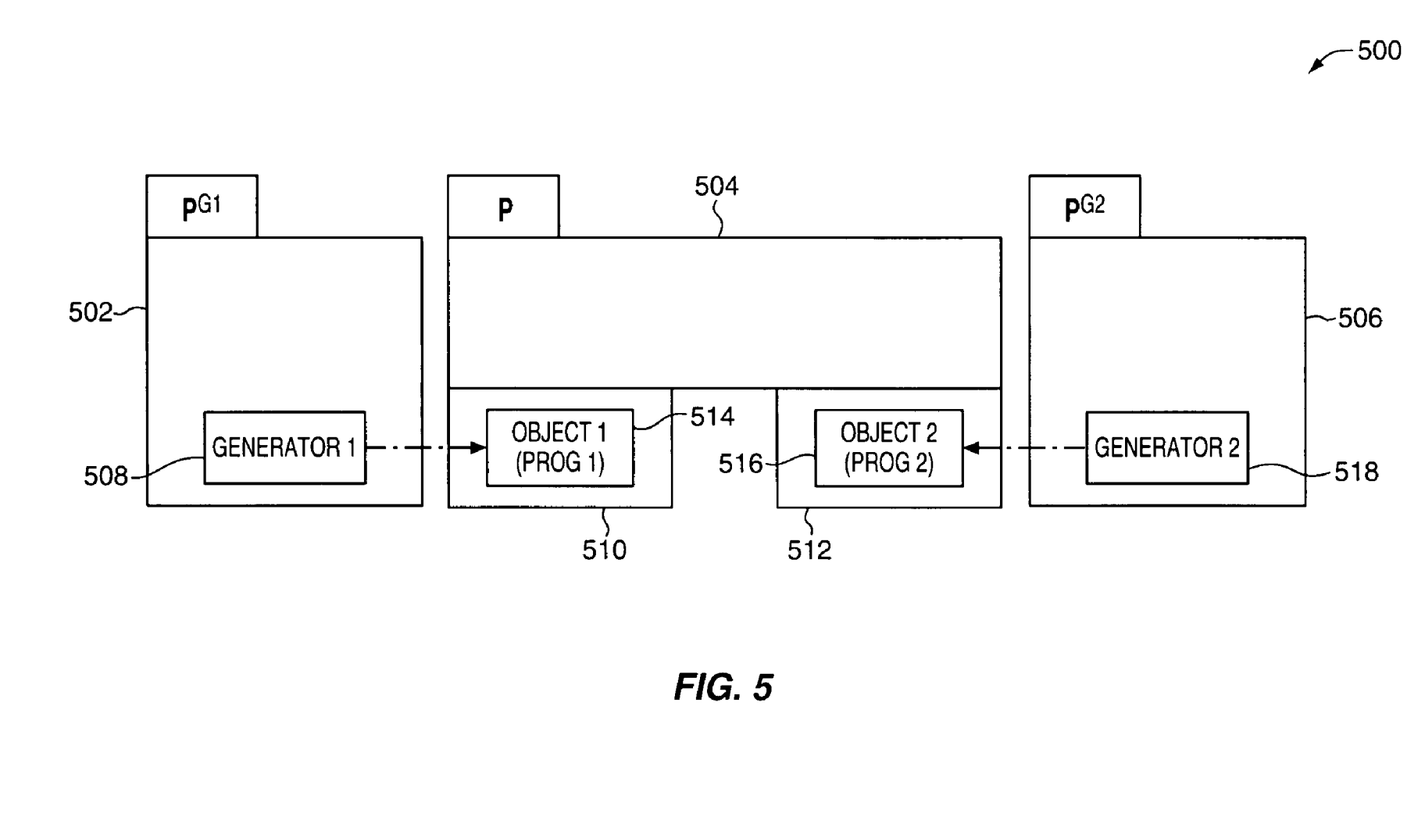
FIG. 5 illustrates an embodiment of an object generation mechanism.

FIG. 5 illustrates an embodiment of an objection generation mechanism 500. In the illustrated embodiment, multiple generation append packages 510-512 are associated with a target package 504. Package 1 502 (e.g., $P^{G1}$) represents a generator 1 508 that is capable of creating object 1 510 in a generation append package 1 510 associated with the target package 504. Similarly, package 2 506 (e.g., $P^{G2}$) represents a generator 2 518 that is capable of creating object 2 516 in a generation append package 2 512. The generation append packages 510-512 are used for creating and storing the objects 514-516. By having the objects 514-516 created in the generation append packages 510-512 separated from the target package 504, the generated objects 514-516 and their coding remain separated from normal target package-based coding, which allows for appropriate treatment when installing corrections, during debugging, when regenerating the code, and the like.

In one embodiment, the generation append packages 510-512 can also have access to a runtime environment. For example, having access to the runtime environment consists of having additional interfaces that can be used from the generated coding, defining of the runtime environment and interfaces by the generators 508, 518 during generation, and having explicit dependencies as implied by the runtime environment.

Figure 6:
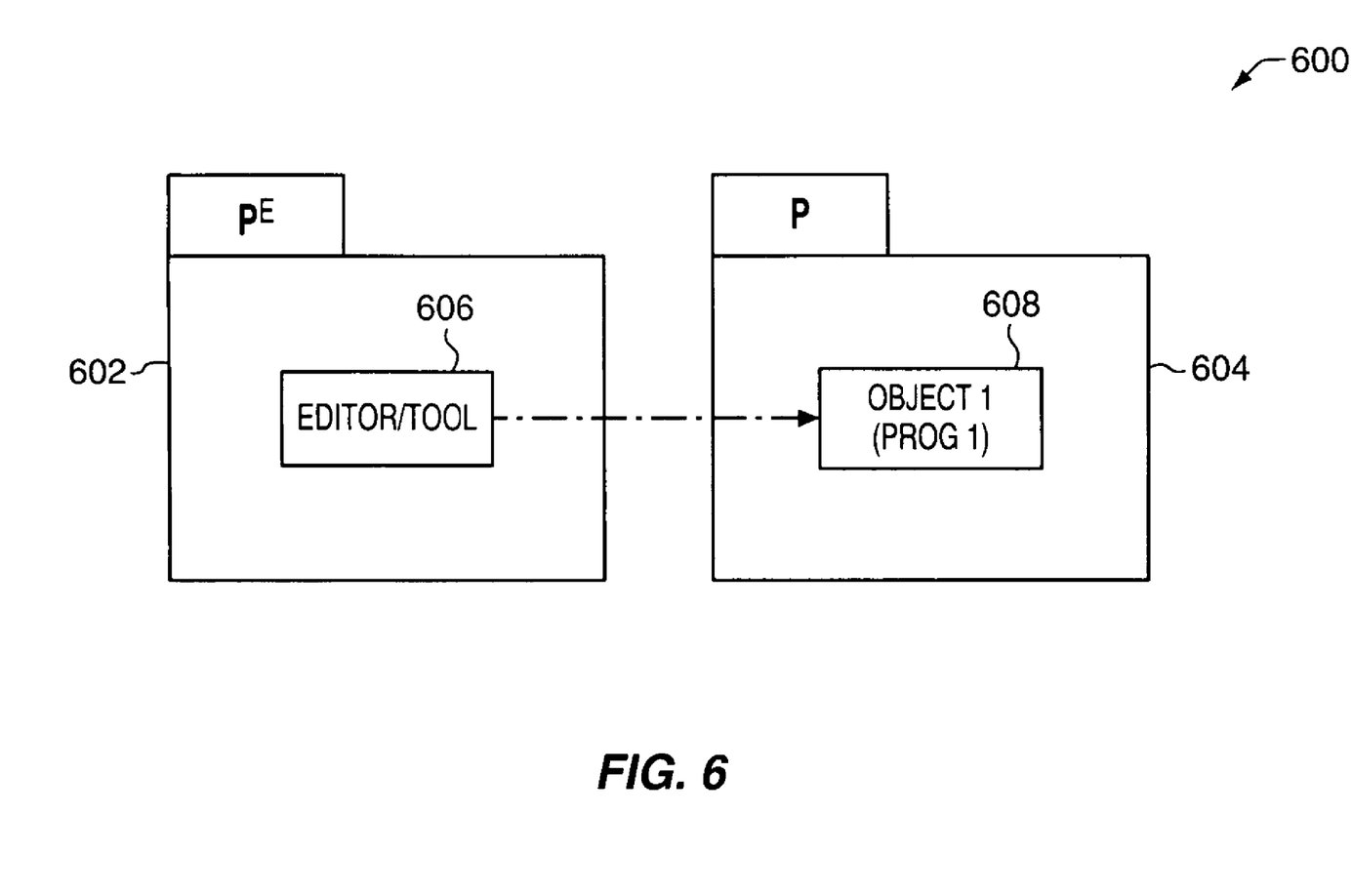
FIG. 6 illustrates an embodiment of an object generation mechanism.

FIG. 6 illustrates an embodiment of an objection generation mechanism 600. In one embodiment, an object 608 is directly generated into a target package 604. When generating an object 608 directly into a target package 604, as opposed to using generation append packages (as described with reference to FIGS. 4 and 5), various tools and editors 606 are used as generators. In one embodiment, for facilitating enabling of the editor 606 access to the entire package tree, inherited client interfaces can be used, which means content of a superpackage's client interface that is also valid for it subpackage can also be inherited. Subpackages can control which client interfaces they inherit.

The editor 606, for example, may include an ABAP-based editor, such as the ABAP Workbench, and the like, written in ABAP. Also, an option may be provided for such editors 606 to access various packages without affecting the encapsulation of these packages. It is contemplated that the editors 606 are not limited to ABAP editors or editors based on any particular language. For example, the object generation mechanism 600 may include other special editors that are desired or made necessary for particular departments within SAP or at customer sites.

In one embodiment, while generators 606 are being created (e.g., either new generators are being designed or existing generators are being selected and/or modified), suitable target packages 604 are selected for object generation. A target package 604 that contains the metadata from which objects are generated is generally considered a suitable target package 604; however, in some circumstances, it may not be regarded suitable. The selection for suitable target package 604 is also performed when using one or more generation append packages for object generation. Since generation append packages can use the data that the target package 604 can use, the usability of the objects used in the metadata is ensured in this manner, even for the generated objects.

If local generation append packages are used, objects from enhancement append packages of this package can also be used in the generated objects 608. If transportable generation append packages are used and if the metadata is enhanced by clients using enhancement append packages, a suitable enhancement append packages can be used as target packages, since the use of objects of the enhancement append package from within the enhanced package and its transportable generation append packages is performed using dynamic techniques. Furthermore, if the generated objects 608 serve the purpose of implementing a particular low-level service, and if the generated objects 608, in turn, use objects from different packages, the package of such service can be regarded as a suitable target package 604. Depending on the system configuration and other relevant factors, such as which objects are to be used, the object 608 can be generated directly into the target package 604 or into a generation append package that is associated with the target package 604.

Figure 7:
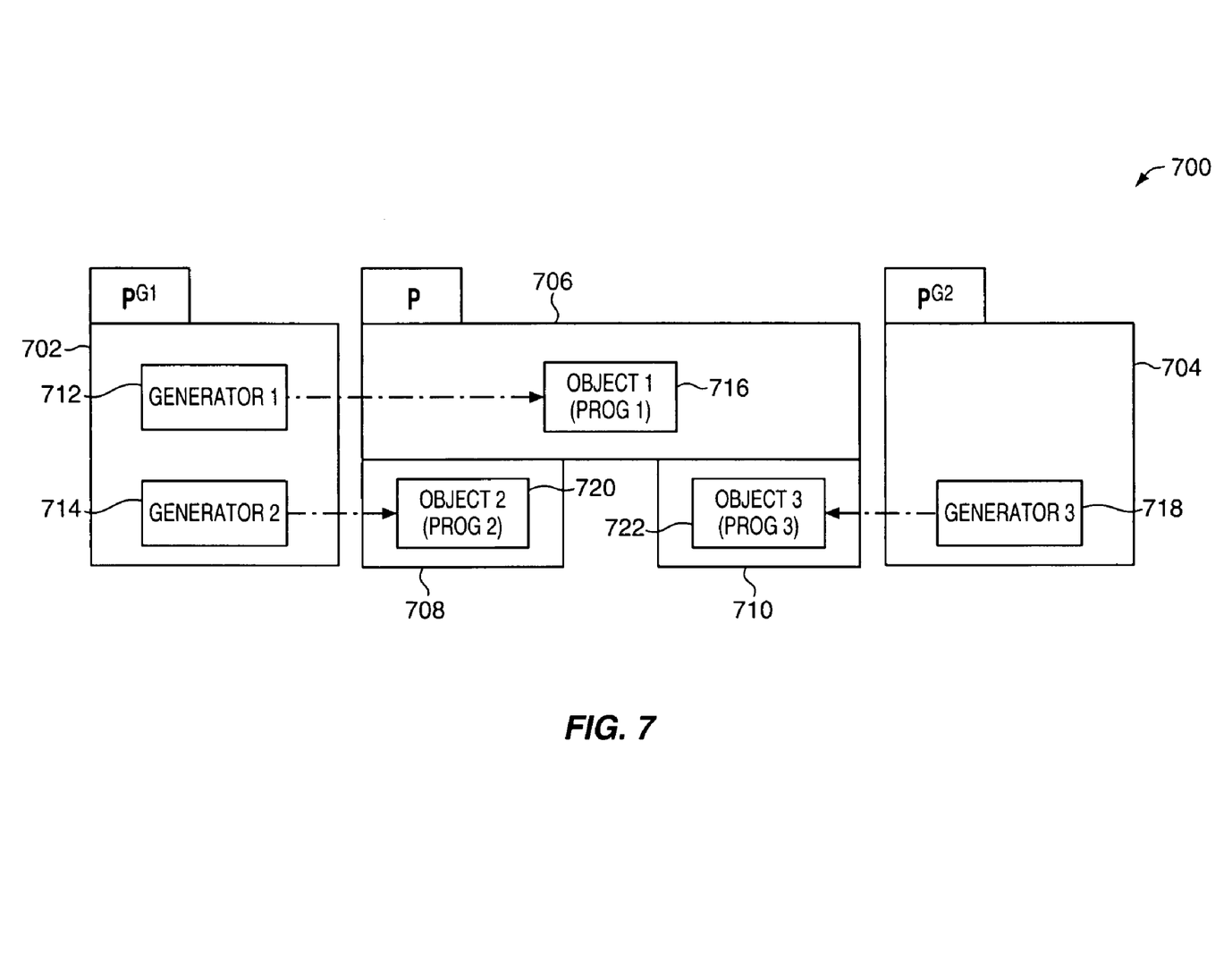
FIG. 7 illustrates an embodiment of an object generation mechanism.

FIG. 7 illustrates an embodiment of an objection generation mechanism 700. In the illustrated embodiment, object generation is performed both directly into the target package 706 and in multiple generation append packages 708-710. As illustrated, package 1 ($P^{G1}$) 702 represents a development environment having generators 1 and 2 712, 714. Generator 1 712 of package 1 702 is used to generate object 1 (PROG 1) 716 directly into the target package 706, while object 2 (PROG 2) 720 is generated by generator 2 714 into a generation append package 708. For example, object 2 720 is used for testing and is automatically generated. Further, since object 2 720 is created for testing and therefore is needed for a short time, it is generated and stored in the corresponding generation append package 708 associated with, but separated from, the target package 706.

Similarly, package 2 ($P^{G2}$) 704 represents generator 3 718, which may need objects from the target package 706. To separate the actual package content of the target package 706 from that of the generated object 3 (PROG 3) 722, generator 3 718 creates object 3 722 into a corresponding generation append package 710, which is also used to store the generated object 3 722. In one embodiment, temporary objects, such as object 2 720, are stored in the database, but they are not transported from within the system. For temporary objects 720, the generator 714 uses a local generation append package 708, unless the target package 706 is also temporary. If the target package 706 is temporary, generation of the object 716 could take place directly into the target package 706.

In one embodiment, a package management is employed in the object generation mechanism 700 to facilitate creating generation append packages 708-710 for the target package 706 and passes its name back to the generators 714, 718. If the generators 714, 718 do not have permission to generate objects 720-722 into the generation append packages 708-710 of the respective target package 706, the call for creating the generation append packages 708-710 may fail. The generators 714, 718 create the. respective objects 720-722 and pass the names of the generation append packages 708-710 to the ABAP statement (e.g., INSERT REPORT, etc.) or to other corresponding calls for creating objects 720-722 (e.g., of the ABAP Dictionary). When generating the object 716 directly into the target package 706, the generator 712 passes the name of the target package 706 to the ABAP statement (e.g., INSERT REPORT, etc.) or to corresponding calls (for objects of the ABAP Dictionary and other objects). If the generator 712 does not have the permission to generate the required object 716 in the target package 706, the ABAP statement or the corresponding calls.

The transiently generated objects may remain in the RAM of the host system and may not be stored in the database. However, a generation append package 708-710 may be needed for transiently generated objects. The generator 714, 718 determines the transient generation using the same package management, as described above, while specifying through a flag that the generation append package 708-710 is not to be local, but transient. The generator 714, 718 creates the respective objects, and passes the name of the generation append package 708-710 to the ABAP statement (e.g., GENERATE SUBROUTINE POOL, etc.). If the generator 714, 718 does not have the permission to generate the transient objects in the generation append package 708-710, the ABAP statement fails.

In one embodiment, the generators 712-714, 718 can configure the generation append packages 708-710, and they can also: (1) set the interfaces that are available to the generation append packages 708-710 as runtime environment; (2) create client interfaces in order to expose the generated objects 720-722 for services; and (3) expose generated objects 720-722 in interfaces of the target package 706 for use through other packages or generation append packages 708-710.

Figure 8:
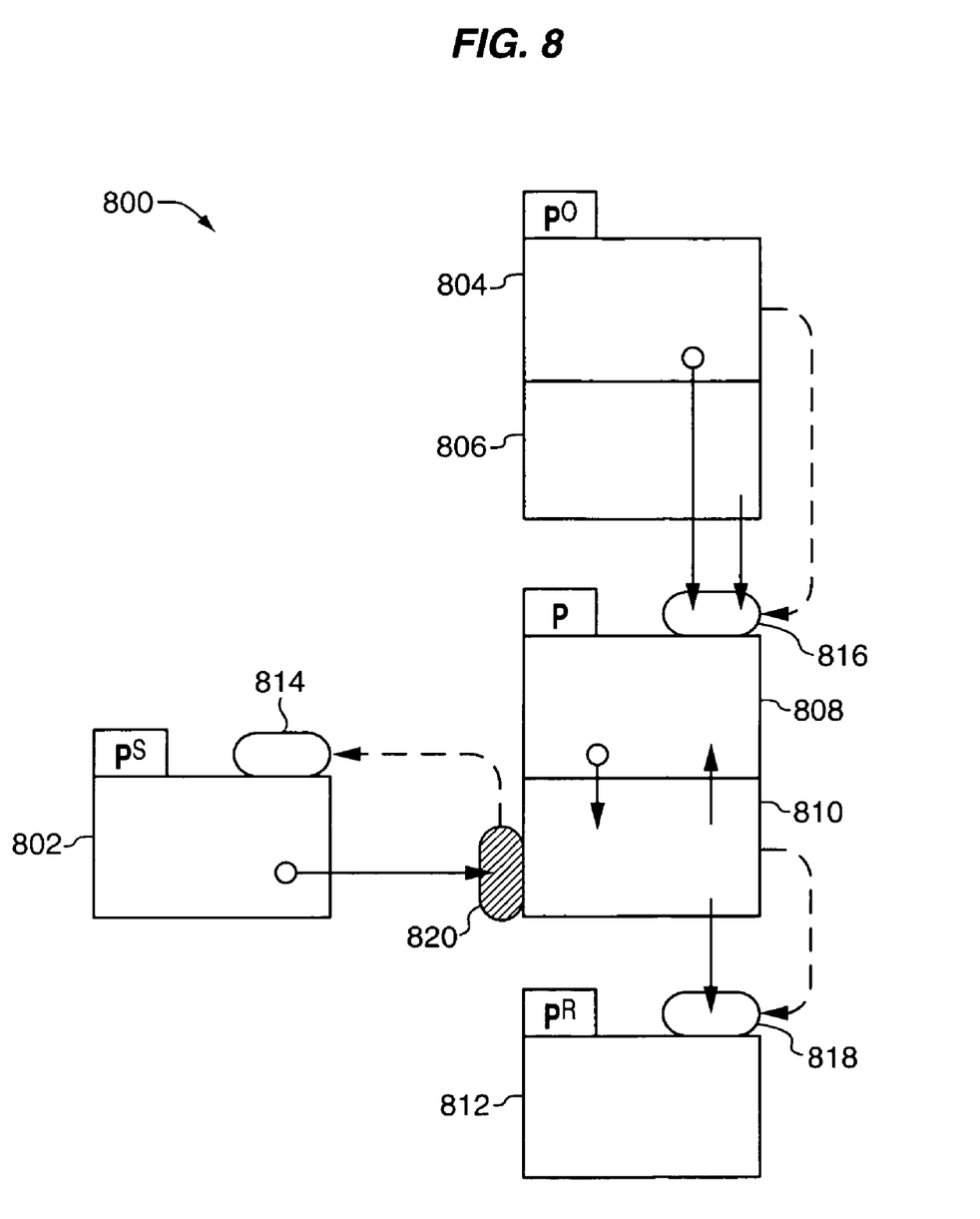
FIG. 8 illustrates an embodiment of access for generation append packages.

FIG. 8 illustrates an embodiment of accesses for generation append packages 806, 810. In the illustrated embodiment, various accesses for generation append packages 806, 810 are provided. From the generation append package 810 associated with the target package 808, objects from the target package 808, as well as objects from the interfaces 818 specified as runtime environment at package ($P^R$) 812 by the generator, can be used. Further, the target package 808 can access the generation append package 810. Other packages (e.g., service package $P^s$ 802, package $P^o$ 804, generation append package 806 of package $P^o$ 804, etc.) can access generated objects through the interfaces created by generators. Since the generation append package 810 is local, accesses from transportable packages (e.g., package P 808 and package $P^o$ 804) to the generation append package 810 take place using dynamic techniques.

Figure 9:
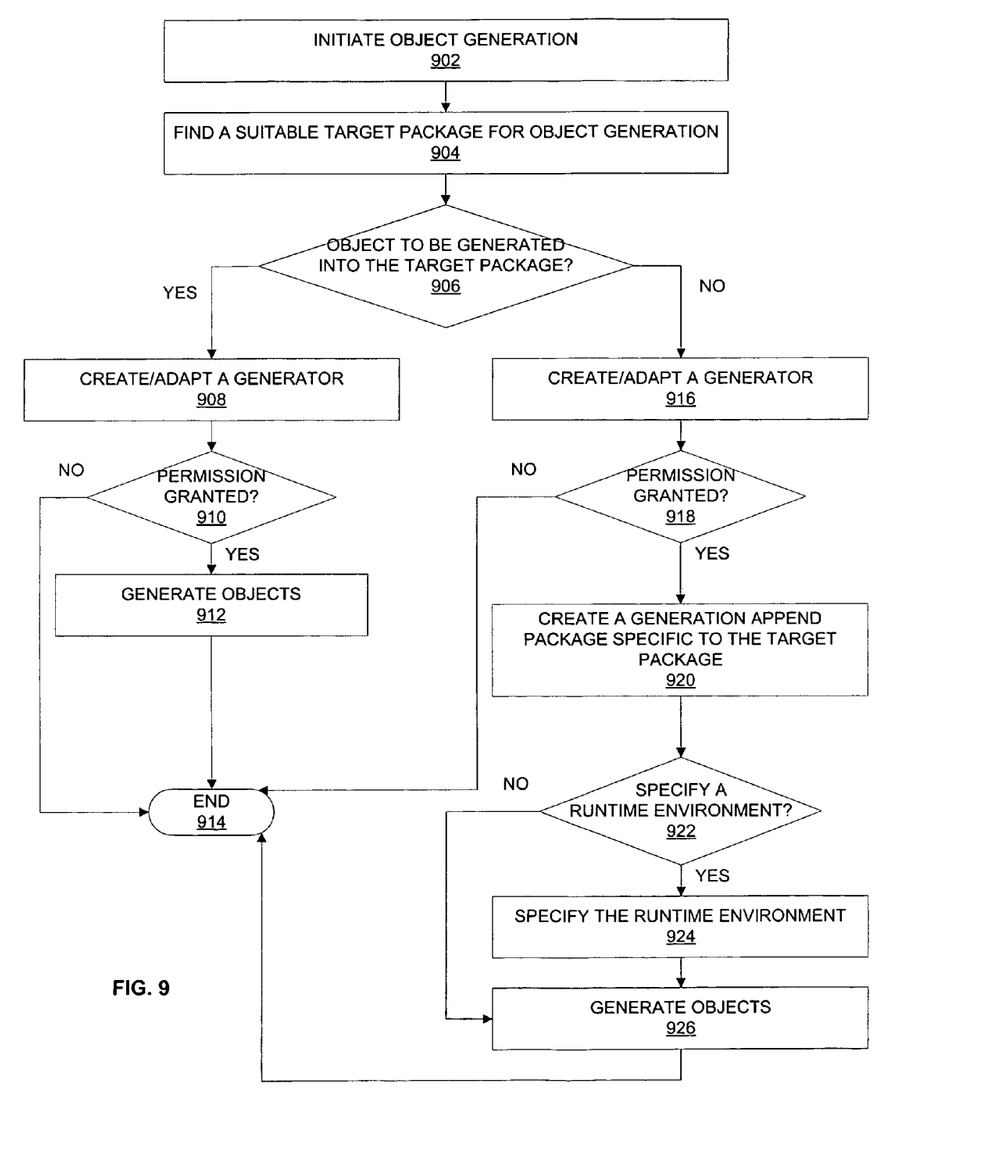
FIG. 9 illustrates an embodiment of a process for object generation in packages.

FIG. 9 illustrates an embodiment for a process for object generation in packages. In one embodiment, object generation is initiated at processing block 902. The initiation for objection generation may include receiving a request or detecting a need for generating one or more objects. At processing block 904, a suitable target package is found. The suitable package selection is based on some of the criteria described in this document. At decision block 906, a determination is made as to whether the object is to be generated directly into the target package. If it is determined that the object is to be created in the target package, a new generator is created or an already existing generator is selected and/or modified to facilitate object generation at processing block 908. The generator may include ABAP-based programs and tools, such as editors, and the like.

At decision block 910, a determination is made as to whether a permission to generate the object in the target package is granted. If yes, the respective object is generated in the target package at processing block 912. The generator passes on the name of the target package to the ABAP statement or to the respective function modules for objects of the ABAP Dictionary, other objects, and the like. If the permission is not granted, the process ends with the ABAP statement or the respective function modules failing at termination block 914.

Referring back to detection block 906, if the object is not to be generated directly into the target package, the object is to be generated using a generation append package to be associated with the target package. Creating an object in the generation append package helps separate the generated object from the actual content of the target package. At processing 916, a generator is created or an already-existing generator is selected and/or modified. The generator may include a generation program or module that provides generation services to facilitate the generation of the object. It is to be noted that the finding of a suitable target package at processing block 904 and the creating/adapting of a generator at processing block 908, 916 are design processes, while the remaining illustrated processes are execution time of the generator.

At decision block 918, a determination is made as to whether a permission to generate the object in the generation append package is granted. If yes, the generation append package specific to the target package is created at processing block 920. In other words, the creation of the generation append package includes assigning of the generation append package to the target package, as the generation append package is created for a specific target package. In one embodiment, a determination may be made as to whether a generation append package already exists. If not, a generation append package is created and, if the permission is granted, an object is generated in that generation append package. If, however, a generation append package already exists, that generation append package can be adapted or modified to be used for generating the object, provided the permission to generate is granted.

At decision block 924922, a determination is made as to whether a runtime environment of the newly-created generation append package is to be specified. If the permission is granted, the runtime environment of the generation append package is specified by the generator at processing block 926. Objects are generated in the generation append package at processing block 926. If the permission to specify the runtime environment is not granted, to the generator or if this goes beyond the dependency control list of the target package, the call fails and the process ends at termination block 914 the objects may still be generated in the generation append package at processing block 926. If the permission is granted, the runtime environment of the generation append package is specified by the generator at processing block 926. For example, if the runtime environment goes beyond the dependency control list of the target package, the call does not fail if the generation append package is a local generation append package or if the target package has permitted a runtime environment that goes beyond the dependency control list.

The generator passes the name of the generation append package to the ABAP statement or other corresponding calls to create the object, for example, for objects of the ABAP Dictionary. The process ends at termination block 914. Referring back to decision block 918, if the permission for objection generation using the generation append package is not granted to the generator, the process ends at termination block 914 with the failing of the ABAP statement or the corresponding call for creating the object. It is contemplated that any of the components (e.g., object, generator, generation append package, etc.) described throughout this document are not limited to a quantity of one, as they may include multiple components, such as one or more objects, one or more generators, one or more generation append package, and the like.

The architectures and methodologies discussed above may be implemented with various types of computing systems such as an application server that includes a Java 2 Platform, Enterprise Edition™ (J2EE) server that supports Enterprise Java Bean ("EJB") components and EJB containers (at the business layer) and/or Servlets and Java Server Pages ("JSP") (at the presentation layer). Of course, other embodiments may be implemented in the context of various different software platforms including, by way of example, Microsoft® .NET, Windows®/NT, Microsoft Transaction Server (MTS), the ABAP platforms developed by SAP AG and comparable platforms.

Figure 10:
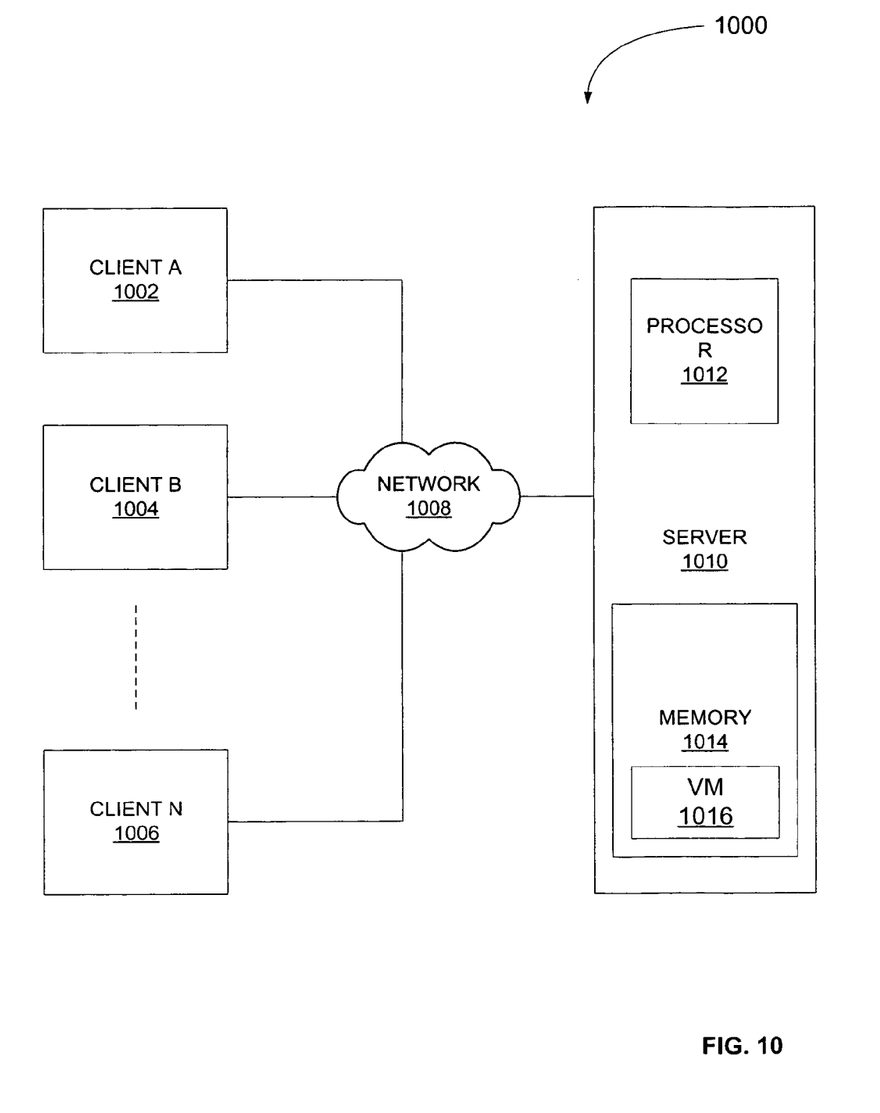
FIG. 10 illustrates an exemplary client/server system used in implementing one or more embodiments of the invention.

FIG. 10 illustrates an exemplary client/server system 1000 used in implementing one or more embodiments of the invention. In the illustrated embodiment, a network 1008 links a server 1010 with various client systems A-N 1002-1006. The server 1010 is a programmable data processing system suitable for implementing apparatus, programs, or methods in accordance with the description. The server 1010 provides a core operating environment for one or more runtime systems that process user requests. The server 1010 includes a processor 1012 and a memory 1014. The memory 1014 can be used to store an operating system a Transmission Control Protocol/Internet Protocol (TCP/IP) stack for communicating over the network 1008, and machine-executable instructions executed by the processor 1012. In some implementations, the server 1010 can include multiple processors, each of which can be used to execute machine-executable instructions.

The memory 1014 can include a shared memory area that is accessible by multiple operating system processes executing at the server 1010. An example of a suitable server to be implemented using the client/server system 1000 may include J2EE compatible servers, such as the Web Application Server developed by SAP AG of Walldorf, Germany, or the WebSphere Application Server developed by International Business Machines Corp. (IBM®) of Armonk, N.Y.

Client systems 1002-1006 are used to execute multiple applications or application interfaces. Each instance of an application or an application interface can constitute a user session. Each user session can generate one or more requests to be processed by the server 1010. The requests may include instructions or code to be executed on a runtime system (e.g., the virtual machine (VM) 1016) on the server 1010. A VM 1016 is an abstract machine that can include an instruction set, a set of registers, a stack, a heap, and a method area, like a real machine or processor. A VM 1016 essentially acts as an interface between program code and the actual processor or hardware platform on which the program code is to be executed. The program code includes instructions from the VM instruction set that manipulates the resources of the VM 1016.

Figure 11:
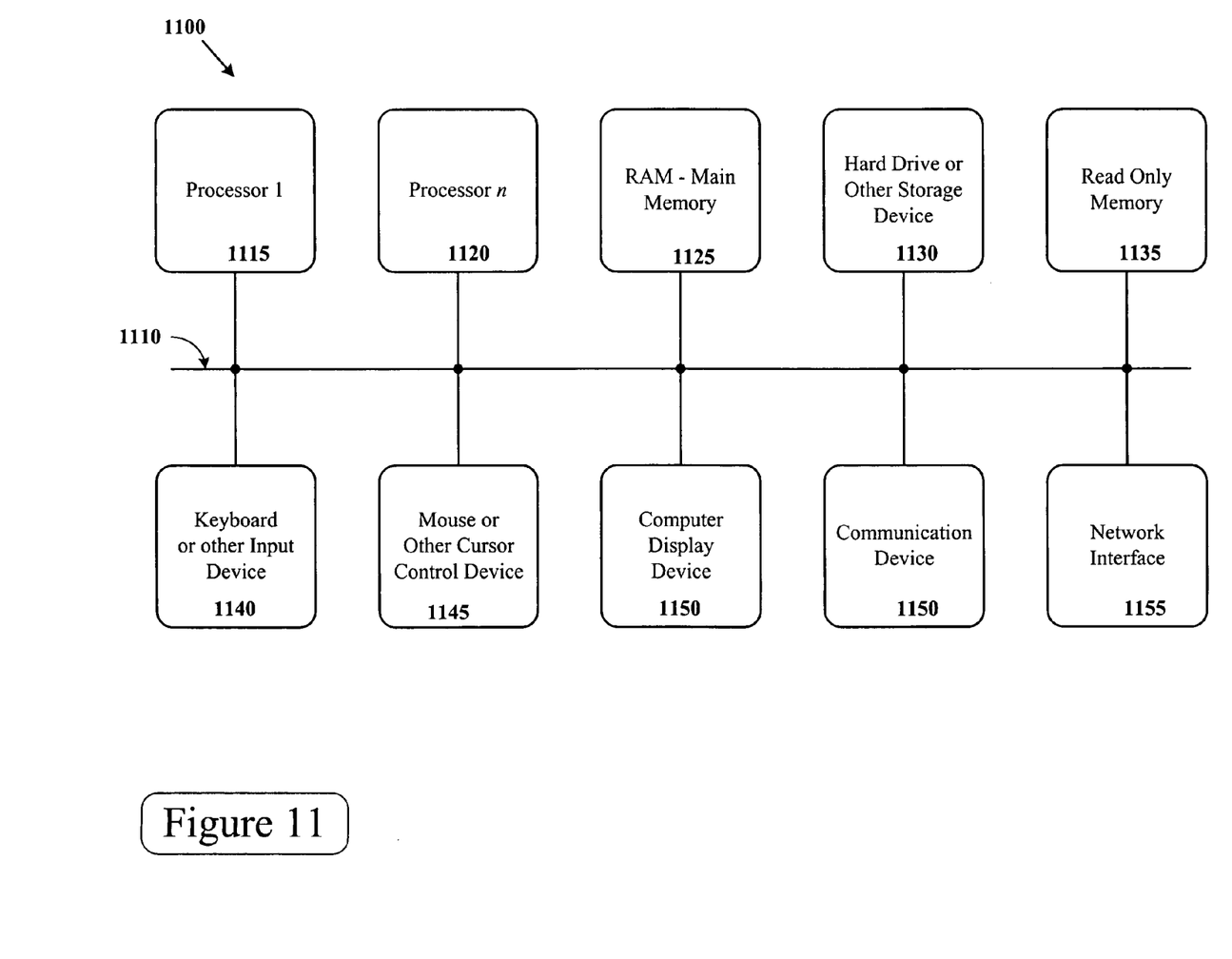
FIG. 11 is an exemplary computer system used in implementing one or more embodiments of the invention.

FIG. 11 is an exemplary computer system 1100 used in implementing an embodiment of the present invention. In this illustration, a system 1100 comprises a bus 1110 or other means for communicating data. The system 1100 includes one or more processors, illustrated as shown as processor 1 1115 through processor n 1120 to process information. The system 1100 further comprises a random access memory (RAM) or other dynamic storage as a main memory 1125 to store information and instructions to be executed by the processor 1115 through 1120. The RAM or other main memory 1125 also may be used for storing temporary variables or other intermediate information during execution of instructions by the processors 1115 through 1120.

A hard drive or other storage device 1130 may be used by the system 1100 for storing information and instructions. The storage device 1130 may include a magnetic disk or optical disc and its corresponding drive, flash memory or other non-volatile memory, or other memory device. Such elements may be combined together or may be separate components. The system 1100 may include a read only memory (ROM) 1135 or other static storage device for storing static information and instructions for the processors 1115 through 1120.

A keyboard or other input device 1140 may be coupled to the bus 1110 for communicating information or command selections to the processors 1115 through 1120. The input device 1140 may include a keyboard, a keypad, a touch-screen and stylus, a voice-activated system, or other input device, or combinations of such devices. The computer may further include a mouse or other cursor control device 1145, which may be a mouse, a trackball, or cursor direction keys to communicate direction information and command selections to the processors and to control cursor movement on a display device. The system 1100 may include a computer display device 1150, such as a cathode ray tube (CRT), liquid crystal display (LCD), or other display technology, to display information to a user. In some environments, the display device may be a touch-screen that is also utilized as at least a part of an input device. In some environments, the computer display device 1150 may be or may include an auditory device, such as a speaker for providing auditory information.

A communication device 1150 may also be coupled to the bus 1110. The communication device 1150 may include a modem, a transceiver, a wireless modem, or other interface device. The system 1100 may be linked to a network or to other device using via an interface 1155, which may include links to the Internet, a local area network, or another environment. The system 1100 may comprise a server that connects to multiple devices. In one embodiment the system 1100 comprises a Java® compatible server that is connected to user devices and to external resources.

While the machine-readable medium 1130 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 1100 and that causes the machine to perform any one or more of the methodologies of the present invention. The term "machine-readable medium" shall accordingly be taken to include, but not be limited to, solid-state memories, optical and magnetic media, and carrier wave signals.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD-ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Furthermore, it is appreciated that a lesser or more equipped computer system than the example described above may be desirable for certain implementations. Therefore, the configuration of system 1100 may vary from implementation to implementation depending upon numerous factors, such as price constraints, performance requirements, technological improvements, and/or other circumstances.

It is noted that processes taught by the discussion above can be practiced within various software environments such as, for example, object-oriented and non-object-oriented programming environments, Java based environments, such as a J2EE environment or environments defined by other releases of the Java standard), or other environments (e.g., a NET environment, a Windows/NT environment each provided by. Microsoft Corporation).

It should be noted that, while the embodiments described herein may be performed under the control of a programmed processor, such as processors 1115 through 1120, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A computer-implemented method comprising:
    selecting a target package for object generation, wherein the selected target package comprises a first portion of functional content exposed via a programming interface and a second portion of functional content which is invisible from outside of the target package;
    generating a client interface that exposes the second portion of the functional content, wherein the second portion of the functional content is made visible from outside of the target package via the client interface;
    creating a generation append package, wherein the generation append package is appended to the target package; and
    generating an object in the generation append package, wherein the generated object comprises the client interface that exposes the second portion of the functional content;
    wherein the generation append package, comprising the client interface, appended to the target package constitutes an enhanced target package; wherein the client interface specifies transport properties different from transport properties associated with the target package, and wherein the specified transport properties are implemented for the enhanced target package via the client interface.

2. The method of claim 1, wherein the object in the generation append package further comprises a software component, separate from the functional content of the target package, and wherein the client interface further exposes at least a portion of the software component.

3. The method of claim 1, wherein the client interface is generated based, at least in part, on data extractors applied to the target package.

4. The method of claim 1, wherein the target package comprises metadata that is used to generate the object.

5. The method of claim 1, further comprising specifying a runtime environment for the generation append package.

6. A system having a processor and memory therein, comprising:
    an object generation mechanism to select a target package for object generation, wherein the selected target package comprises a first portion of functional content exposed via a programming interface and a second portion of functional content which is invisible from outside of the target package;
    the object generation mechanism to generate a client interface that exposes the second portion of the functional content, wherein the second portion of the functional content is made visible from outside of the target package via the client interface;
    a package generator to create a generation append package, wherein the generation append package is appended to the target package; and
    the object generation mechanism to generate an object in the generation append package, wherein the generated object comprises the client interface that exposes the second portion of the functional content;
    wherein the generation append package, comprising the client interface, appended to the target package constitutes an enhanced target package; wherein the client interface specifies transport properties different from transport properties associated with the target package, and wherein the specified transport properties are implemented for the enhanced target package via the client interface.

7. The system of claim 6, wherein the object in the generation append package further comprises a software component, separate from the functional content of the target package, and wherein the client interface to further expose at least a portion of the software component.

8. The system of claim 6, wherein the client interface is generated based, at least in part, on data extractors applied to the target package.

9. The system of claim 6, wherein the object generation mechanism to further: specify a runtime environment for the generation append package.

10. A machine-readable medium having computer instructions stored therein that, when executed by a processor, cause the processor to perform a method comprising:
    selecting a target package for object generation, wherein the selected target package comprises a first portion of functional content exposed via a programming interface and a second portion of functional content which is invisible from outside of the target package;
    generating a client interface that exposes the second portion of the functional content, wherein the second portion of the functional content is made visible from outside of the target package via the client interface;
    creating a generation append package, wherein the generation append package is appended to the target package; and
    generating an object in the generation append package, wherein the generated object comprises the client interface that exposes the second portion of the functional content;
    wherein the generation append package, comprising the client interface, appended to the target package constitutes an enhanced target package; wherein the client interface specifies transport properties different from transport properties associated with the target package, and wherein the specified transport properties are implemented for the enhanced target package via the client interface.

11. The machine-readable medium of claim 10, wherein the object in the generation append package further comprises a software component, separate from the functional content of the target package, and wherein the client interface further exposes at least a portion of the software component.

12. The machine-readable medium of claim 10, wherein the client interface is generated based, at least in part, on data extractors applied to the target package.

13. The machine-readable medium of claim 10, further comprising specifying a runtime environment for the generation append package.

* * * * *

UNITED STATES PATENT AND TRADEMARK OFFICE
CERTIFICATE OF CORRECTION

| | |
|---|---|
| PATENT NO. | : 7,634,771 B2 |
| APPLICATION NO. | : 11/118700 |
| DATED | : December 15, 2009 |
| INVENTOR(S) | : Benjes et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1118 days.

Signed and Sealed this

Twenty-first Day of December, 2010

David J. Kappos
*Director of the United States Patent and Trademark Office*